(12) United States Patent
Kunigita

(10) Patent No.: US 7,263,499 B2
(45) Date of Patent: Aug. 28, 2007

(54) ELECTRONIC COMMERCE SYSTEM IN WHICH COMMODITIES ARE DISPLAYED IN COMBINATION WITH BACKGROUND IMAGES

(75) Inventor: Hisayuki Kunigita, Tokyo (JP)

(73) Assignee: Sony Computer Entertainment Inc. (JP)

( * ) Notice: Subject to any disclaimer, the term of this patent is extended or adjusted under 35 U.S.C. 154(b) by 591 days.

(21) Appl. No.: 10/057,074

(22) Filed: Jan. 24, 2002

(65) Prior Publication Data

US 2002/0111882 A1 Aug. 15, 2002

(30) Foreign Application Priority Data

Jan. 24, 2001 (JP) ............................. P2001-016128
Jan. 8, 2002 (JP) ............................. P2002-001526

(51) Int. Cl.
*G06Q 30/00* (2006.01)
*G09G 5/00* (2006.01)

(52) U.S. Cl. ..................... 705/26; 705/27; 345/619; 345/629

(58) Field of Classification Search ................. 705/26, 705/27; 345/619, 624, 629, 653, 664, 679, 345/654, 665, 680, 649
See application file for complete search history.

(56) References Cited

U.S. PATENT DOCUMENTS

| | | | | |
|---|---|---|---|---|
| 4,261,012 A * | 4/1981 | Maloomian | .................. | 348/77 |
| 5,053,956 A | 10/1991 | Donald et al. | | |
| 5,257,203 A * | 10/1993 | Riley et al. | .................. | 700/163 |
| 5,664,083 A * | 9/1997 | Takeuchi et al. | .............. | 345/653 |
| 5,848,399 A * | 12/1998 | Burke | .......................... | 705/27 |
| 5,880,974 A | 3/1999 | Tarumi et al. | | |
| 5,884,029 A * | 3/1999 | Brush et al. | ................. | 709/202 |
| 5,970,471 A * | 10/1999 | Hill | ............................. | 705/26 |
| 5,983,201 A * | 11/1999 | Fay | .............................. | 705/27 |
| 6,054,996 A * | 4/2000 | Bardon et al. | .............. | 345/619 |
| 6,064,749 A * | 5/2000 | Hirota et al. | ............... | 382/103 |
| 6,118,456 A * | 9/2000 | Cooper | ....................... | 345/619 |
| 6,144,388 A | 11/2000 | Bornstein | | |
| 6,331,858 B2 * | 12/2001 | Fisher | ........................ | 345/582 |
| 6,333,749 B1 * | 12/2001 | Reinhardt et al. | .......... | 345/629 |
| 6,608,628 B1 * | 8/2003 | Ross et al. | .................. | 346/619 |
| 6,901,379 B1 * | 5/2005 | Balter et al. | ................. | 705/27 |

(Continued)

FOREIGN PATENT DOCUMENTS

JP 06-044358 A1 2/1994

(Continued)

OTHER PUBLICATIONS

Eckhouse, J., "Interactive Ads Will Home in on Consumers," San Francisco Chronicle, Oct. 1, 1993, Final Edition, Business Section, p. B2.*

(Continued)

*Primary Examiner*—Nicholas D. Rosen
(74) *Attorney, Agent, or Firm*—Lerner, David, Littenberg, Krumholz & Mentlik, LLP

(57) ABSTRACT

A server connected to a network generates an image by combining an image of a commodity and an image of a background together and transmits the resultant image to a user terminal. If the server receives from the user a request to purchase the commodity, the server produces a command to deliver the commodity to the user.

18 Claims, 7 Drawing Sheets

U.S. PATENT DOCUMENTS

| | | | |
|---|---|---|---|
| 6,912,293 B1* | 6/2005 | Korobkin | 382/100 |
| 7,139,685 B2* | 11/2006 | Bascle et al. | 703/1 |
| 2001/0009418 A1* | 7/2001 | Hiroike et al. | 345/427 |
| 2002/0019778 A1* | 2/2002 | Isaacson et al. | 705/26 |
| 2002/0060691 A1* | 5/2002 | Broemmelsiek | 345/649 |
| 2003/0088483 A1* | 5/2003 | Moyer | 705/27 |
| 2003/0138752 A1* | 7/2003 | Bergersen | 433/2 |
| 2005/0071257 A1* | 3/2005 | Giannini | 705/27 |
| 2006/0178952 A1* | 8/2006 | Harris | 705/27 |

FOREIGN PATENT DOCUMENTS

| | | |
|---|---|---|
| JP | 9-160977 A | 6/1997 |
| JP | 9-171569 A1 | 6/1997 |
| JP | 09-204478 A1 | 8/1997 |
| JP | 09-259252 A1 | 10/1997 |
| JP | 10-207941 A1 | 8/1998 |
| JP | 11-102007 A1 | 4/1999 |
| JP | 11-265243 A1 | 9/1999 |
| JP | 2000-048081 A1 | 2/2000 |
| WO | WO-0049544 A2 * | 8/2000 |

OTHER PUBLICATIONS

Griffith, V., "Information Technology: Seek and You Shall Find: Internet Shopping," Financial Times, London Edition, Apr. 16, 1997, p. 24.*

Kehoe, L., "Inside Track: Tricks of the Cyber Trade," Financial Times, London Edition, May 27, 1998, p. 12.*

Anon., "Amazon.com Adds Dimensions," InternetWeek, p. 11, Aug. 3, 1998.*

Anon., "3Dshopping.com Partners with New Mexico Software to Deploy and Market Proprietary 3D Internet Acccelerator Technology," Business Wire, Jan. 19, 2000.*

Pry, W., "Online Retailers Add 3-D, Music to Web Sites for Sense of Reality," Knight-Ridder Tribune Business News (Dallas Morning News- Texas), Nov. 19, 2000.*

Anon., "Viking Office Products Launches New E-Commerce Site for U.S.," Business Wire, Feb. 9, 2000.*

Anon., "Office Depot Launches Second E-Commerce Site in Japan under the Office Depot Name; the Company Now Has Eight Unique E-Commerce Sites Around the World," Business Wire, Sep. 28, 2000.*

* cited by examiner

FIG. 2

| COMMODITY NAME M1 | COLOR C1 | COLOR C2 | ---- | COLOR CN | SIZE DATA | OBJECT DATA ADDRESS | TEXTURE DATA ADDRESS | TEXTURE DATA ADDRESS | ---- | TEXTURE DATA ADDRESS |

VENDOR NAME

FIG. 3

| TEXTURE NUMBER | TEXTURE ADDRESS IN THE MEMORY | TEXTURE ADDRESS ON THE SCREEN |
|---|---|---|
| T1 | X X X X | X X X X |
| T2 | X X X X | X X X X |
| ⋮ | ⋮ | ⋮ |
| Tn | X X X X | X X X X |
| Tn + 1 | Y Y Y Y | Y Y Y Y |
| ⋮ | ⋮ | ⋮ |
| Tn + m | Y Y Y Y | Y Y Y Y |

FIG. 4

| COMMODITY NAME | PURCHASE DATE | COLOR | BACKGROUND TEXTURE ADDRESS |
|---|---|---|---|
| X X X X | Y Y M M D D | X X | X X |

FIG. 5

ELECTRONIC COMMERCE SYSTEM IN WHICH COMMODITIES ARE DISPLAYED IN COMBINATION WITH BACKGROUND IMAGES

CROSS-REFERENCE TO RELATED APPLICATIONS

The present application claims priority from Japanese Application Nos. 2001-16128 filed Jan. 24, 2001 and 2002-01526 filed Jan. 8, 2002, the disclosures of which are hereby incorporated by reference herein.

BACKGROUND OF THE INVENTION

The present invention relates to a system that allows a user to obtain, via a Web system, exact and detailed information of a commodity selected by the user.

In a conventional technique, when one purchases a commodity such as furniture via a Web system (an electronic commerce system), one has to decide whether to purchase the commodity only on the basis of an image of the commodity.

In the case where a commodity such as furniture is purchased via an electronic commerce system after making a decision on the basis of only an image thereof, there is a possibility that the furniture is too big to place it in a room or the color or the design does not match the room. Thus, there is a possibility that the purchaser has to endure the troublesome job of sending the commodity back to the seller. In this case, trouble may occur between the purchaser and the seller.

SUMMARY OF THE INVENTION

In view of the above, it is an object of the present invention to provide a system that allows a user to know the details of a commodity selected by the user and to see how the commodity looks when the commodity is placed in a background selected by the user.

According to an aspect of the present invention, there is provided an electronic commerce system, including a user terminal operable by a user and including a display; a first storage unit operable to store image data of commodities for sale to the user; a second storage unit operable to store image data of backgrounds; a first acquisition unit operable to acquire content data of one of the commodities and one of the backgrounds selected by the user via the user terminal; a second acquisition unit operable to acquire image data of the one commodity from the first storage unit and image data of the one background from the second storage unit; a graphics unit operable to produce a display image by combining an image of the one commodity created from the image data of the one commodity and an image of the one background created from the image data of the one background; and a supply unit operable to supply the display image to the user terminal, thereby enabling the display image to be displayed on the display.

In this electronic commerce system according to the present invention, the graphics unit may include a unit for incorporating a scale image into the display image.

In this electronic commerce system according to the present invention, the graphics unit may include a unit for rotating the image of the one commodity.

In this electronic commerce system according to the present invention, the graphics unit may include a unit for changing a viewpoint for the image of the one commodity.

The electronic commerce system according to the present invention may further include another acquisition unit operable to acquire from the user terminal custom image data of a background prepared by the user and to store the custom image data in the second storage unit.

The electronic commerce system according to the present invention may further include an adjustment unit operable to adjust a scale of the custom image data prepared by the user.

In this electronic commerce system according to the present invention, the user terminal may be a mobile communication terminal.

According to another aspect of the present invention, there is provided an electronic commerce system, including a user terminal operable by a user and including a display; and a commodity purchase assistance apparatus connected to the user terminal via a network, the commodity purchase assistance apparatus including a first storage unit operable to store image data of commodities for sale to the user; a second storage unit operable to store image data of backgrounds; a first acquisition unit operable to acquire content data of one of the commodities and one of the backgrounds selected by the user via the user terminal; a second acquisition unit operable to acquire image data of the one commodity from the first storage unit and image data of the one background from the second storage unit; a graphics unit operable to produce a display image by combining an image of the one commodity created from the image data of the one commodity and an image of the one background created from the image data of the one background; and a supply unit operable to supply the display image to the user terminal, thereby enabling the display image to be displayed on the display.

In this electronic commerce system according to the present invention, the commodity purchase assistance apparatus may further include a unit operable to allow the commodity purchase assistance apparatus to function as a server.

In this electronic commerce system according to the present invention, the user terminal may further include a transmitter unit operable to transmit to the commodity purchase assistance apparatus a request to purchase a commodity corresponding to the display image displayed on the display.

In this electronic commerce system according to the present invention, the commodity purchase assistance apparatus may further include a unit operable to make an arrangement for delivering the commodity when the request for purchasing the commodity is transmitted thereto from the user terminal.

According to another aspect of the present invention, there is provided an electronic commerce system, including a user terminal operable by a user and including a display; a first storage unit operable to store image data of commodities for sale to the user; a second storage unit operable to store image data of backgrounds; and a commodity purchase assistance apparatus connected to the user terminal and the first and second storage units via a network or a cable, the commodity purchase assistance apparatus including a first acquisition unit operable to acquire content data of one of the commodities and one of the backgrounds selected by the user via the user terminal; a second acquisition unit operable to acquire image data of the one commodity from the first storage unit and image data of the one background from the second storage unit; a graphics unit operable to produce a display image by combining an image of the one commodity created from the image data of the one commodity and an image of the one background created from the image data of the one background; and a supply unit operable to supply the display image to the user terminal, thereby enabling the display image to be displayed on the display.

According to still another aspect of the present invention, there is provided a commodity purchase assistance apparatus connected via a network to a user terminal operable by a user and including a display, the commodity purchase assistance apparatus including a first storage unit operable to store image data of commodities for sale to the user; a second storage unit operable to store image data of backgrounds; a first acquisition unit operable to acquire content data of one of the commodities and one of the backgrounds selected by the user via the user terminal; a second acquisition unit operable to acquire image data of the one commodity from the first storage unit and image data of the one background from the second storage unit; a graphics unit operable to produce a display image by combining an image of the one commodity created from the image data of the one commodity and an image of the one background created from the image data of the one background; and a supply unit operable to supply the display image to the user terminal, thereby enabling the display image to be displayed on the display.

In this commodity purchase assistance apparatus according to the present invention, the graphics unit may include a unit for incorporating a scale image into the display image.

In this commodity purchase assistance apparatus according to the present invention, the graphics unit may include a unit for rotating the image of the one commodity.

In this commodity purchase assistance apparatus according to the present invention, the graphics unit may include a unit for changing a viewpoint for the image of the one commodity.

The commodity purchase assistance apparatus according to the present invention may further include another acquisition unit operable to acquire from the user terminal custom image data of a background prepared by the user and to store the custom image data in the second storage unit.

The commodity purchase assistance apparatus according to the present invention may further include an adjustment unit operable to adjust a scale of the custom image data prepared by the user.

In this commodity purchase assistance apparatus according to the present invention, the image data of the one background may be stored in advance in the second storage unit or supplied from the user terminal.

The commodity purchase assistance apparatus according to the present invention may further include a unit operable to allow the commodity purchase assistance apparatus to function as a server.

According to still another aspect of the present invention, there is provided a terminal operable by a user, the terminal being connected via a network to a storage device operable to store image data of commodities for sale to the user and to store image data of backgrounds, the terminal including a display; a unit operable by the user to select one of the commodities and one of the backgrounds; an acquisition unit operable to acquire image data of the one commodity and image data of the one background from the storage device; a graphics unit operable to produce a display image by combining an image of the one commodity created from the image data of the one commodity and an image of the one background created from the image data of the one background; and a unit operable to display the display image on the display.

According to still another aspect of the present invention, there is provided a terminal operable by a user, the terminal being connected via a network to a storage device operable to store image data of commodities for sale to the user, the terminal including a display; a storage unit operable to store image data of backgrounds; a unit operable by the user to select one of the commodities and one of the backgrounds; an acquisition unit operable to acquire image data of the one commodity from the storage device and image data of the one background from the storage unit; a graphics unit operable to produce a display image by combining an image of the one commodity created from the image data of the one commodity and an image of the one background created from the image data of the one background; and a unit operable to display the display image on the display.

According to still another aspect of the present invention, there is provided a method using a computer for assisting a user in purchasing a commodity, the method including acquiring content data of a particular commodity and a background selected by the user via a user terminal; acquiring image data corresponding to the particular commodity and image data corresponding to the selected background from a storage unit; producing a display image by combining an image of the particular commodity and an image of the selected background from the acquired image data; and displaying the display image on a display of the user terminal.

The commodity purchase assistance method according to the present invention may further include storing image data of a background prepared by the user in the storage unit.

The commodity purchase assistance method according to the present invention may further include adjusting a scale of the image data of the background prepared by the user.

According to still another aspect of the present invention, there is provided a commodity purchase assistance apparatus, including a commodity information database; means for producing a composite image by combining an image of a commodity and an image of a background in accordance with information about the commodity and the background selected by a user based on the database; and means for supplying the composite image via a network to a terminal operable by the user, thereby enabling the composite image to be displayed on a display of the terminal.

According to still another aspect of the present invention, there is provided an electronic commerce system having a commodity purchase assistance capability, including a server including a commodity information database, and means for producing a composite image by combining an image of a commodity and an image of a background in accordance with information about the commodity and the background selected by a user based on the database; and a terminal operable by the user to view the composite image and to transmit a request to purchase the commodity.

According to still another aspect of the present invention, there is provided an electronic commerce system having a commodity purchase assistance capability and having a first apparatus connected to a network and a second apparatus connected to the network and operable by a user, wherein the first apparatus includes means for producing a composite image by combining an image of a commodity and an image of a background; means for transmitting the composite image to the second apparatus; and means for producing information needed to make an arrangement for delivering the commodity to the user in response to a request from the user for purchasing the commodity.

BRIEF DESCRIPTION OF THE DRAWINGS

FIG. 2 is a diagram illustrating a commodity information database;

FIG. 3 is a diagram used to explain a texture database;

FIG. 4 is a diagram used to explain a purchase history;

FIG. 5 is a diagram used to explain an example of a browser screen used to select a commodity;

DETAILED DESCRIPTION

The present invention is described in further detail below with reference to preferred embodiments in conjunction with the accompanying drawings.

Figure 1:
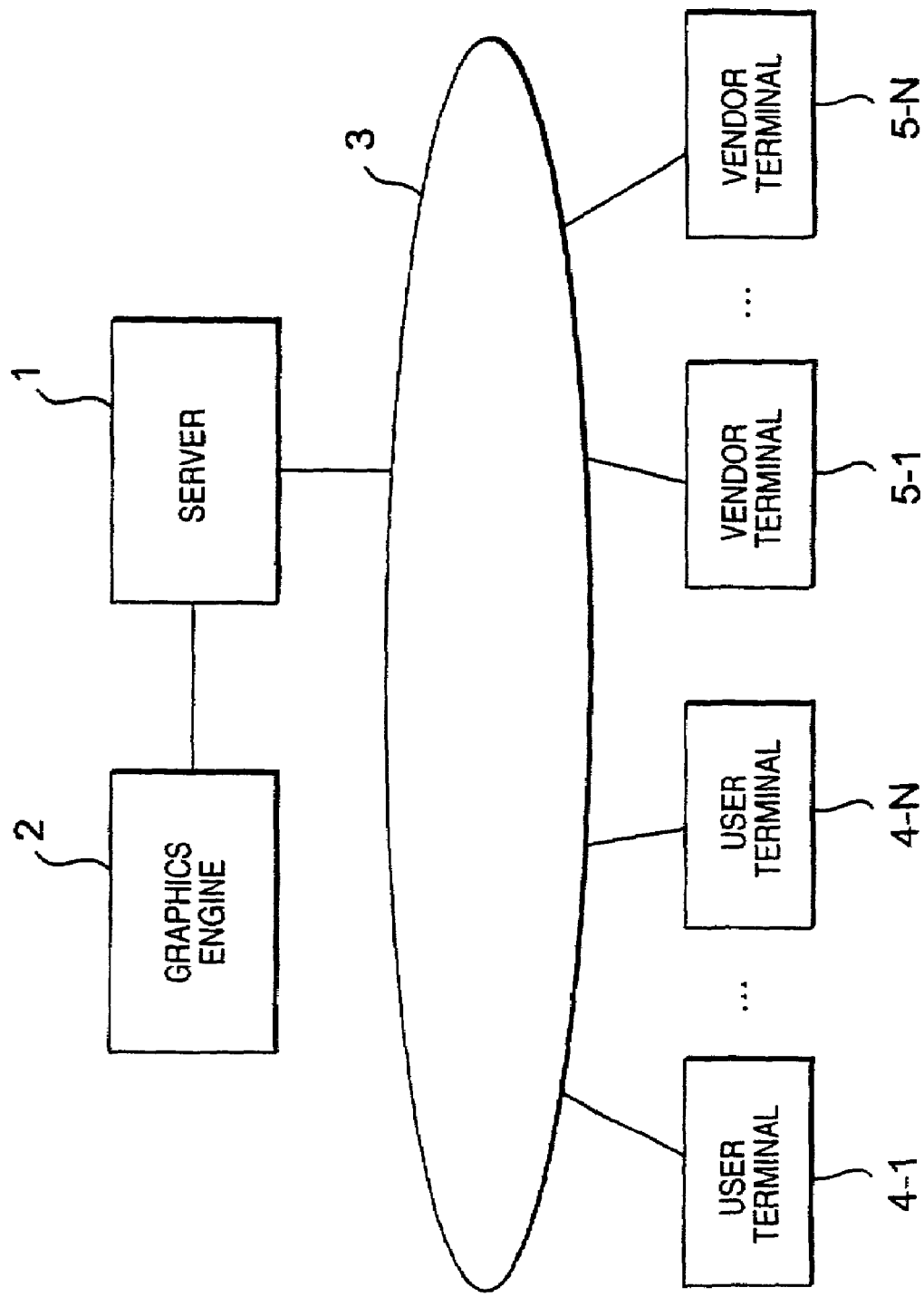
FIG. 1 is a block diagram illustrating an electronic commerce system according to an embodiment of the present invention.

FIG. 1 is a block diagram illustrating an electronic commerce system according to an embodiment of the present invention. A server 1 is connected to user terminals 4-1 to 4-N and vendor terminals 5-1 to 5-N via a network 3. The server 1 is also connected to a graphics engine 2. The graphics engine 2 may be incorporated in the server 1.

In accordance with object data of a commodity supplied from the server 1, that is, in accordance with vertex coordinate information of polygons representing an image of the commodity, viewpoint information indicating the viewpoint from which the object is viewed, and texture information associated with the commodity, the graphics engine 2 generates a commodity image having a pattern such as a texture pattern. The graphics engine 2 combines the image data, a scale image and texture data indicating a background supplied from the server 1 into a final image. The graphics engine 2 is capable of rotating, expanding, or reducing a 3-dimensional image of a commodity thereby providing, for example, a change in the viewpoint associated with the image of the commodity.

The user terminals 4-1 to 4-N are used to display the final image supplied from the server 1 and to issue a purchase request for a commodity. Any of the user terminals 4-1 to 4-N may be realized by a personal computer or a mobile communication terminal (such as a portable telephone).

The vendor terminals 5-1 to 5-N are used by respective vendors to register commodity image information such as size data or object data of a commodity as texture information into the server 1. The commodity image information may be produced by taking a picture of a commodity using a digital camera or the like. An order issued by a user is transmitted to a vendor via the server 1 and a corresponding one of the vendor terminals 5-1 to 5-N.

FIG. 2 illustrates an example of a commodity information database including information about the commodity image. All those data described above are registered in the server 1 via the vendor terminals 5-1 to 5-N. As can be seen from the example shown in FIG. 2, the commodity information database includes data indicating, for each commodity, a commodity name M1, colors C1 to CN, a size, an object data address, and a texture data address.

The object data address and the texture data address indicate addresses of the object data and the texture data, respectively, on a storage device of the server 1, such as a hard disk drive, an MO (magneto-optical disk) and a memory device. One object data and one object data address are assigned to each commodity, while one texture data and one texture data address are assigned to each color.

FIG. 3 illustrates an example of a texture database. As shown in FIG. 3, the texture database includes data indicating texture numbers $T_1$ to $T_{n+m}$, texture addresses in the memory, and the texture addresses on the screen.

Of the texture data shown in FIG. 3, the data of the texture numbers $T_1$ to $T_n$ are stored in the storage device. The data of the texture numbers $T_{n+1}$ to $T_{n+m}$, which have been uploaded by the user, are stored in the main memory (memory device) or the like of the server 1 together with the texture data of the texture numbers $T_1$ to $T_n$ read from the storage device. That is, the database shown in FIG. 3 is located in the main memory. A texture address in the memory indicates a location in the storage device of the server 1 at which texture data is stored and a location in the main memory at which texture data is stored.

Figure 6:
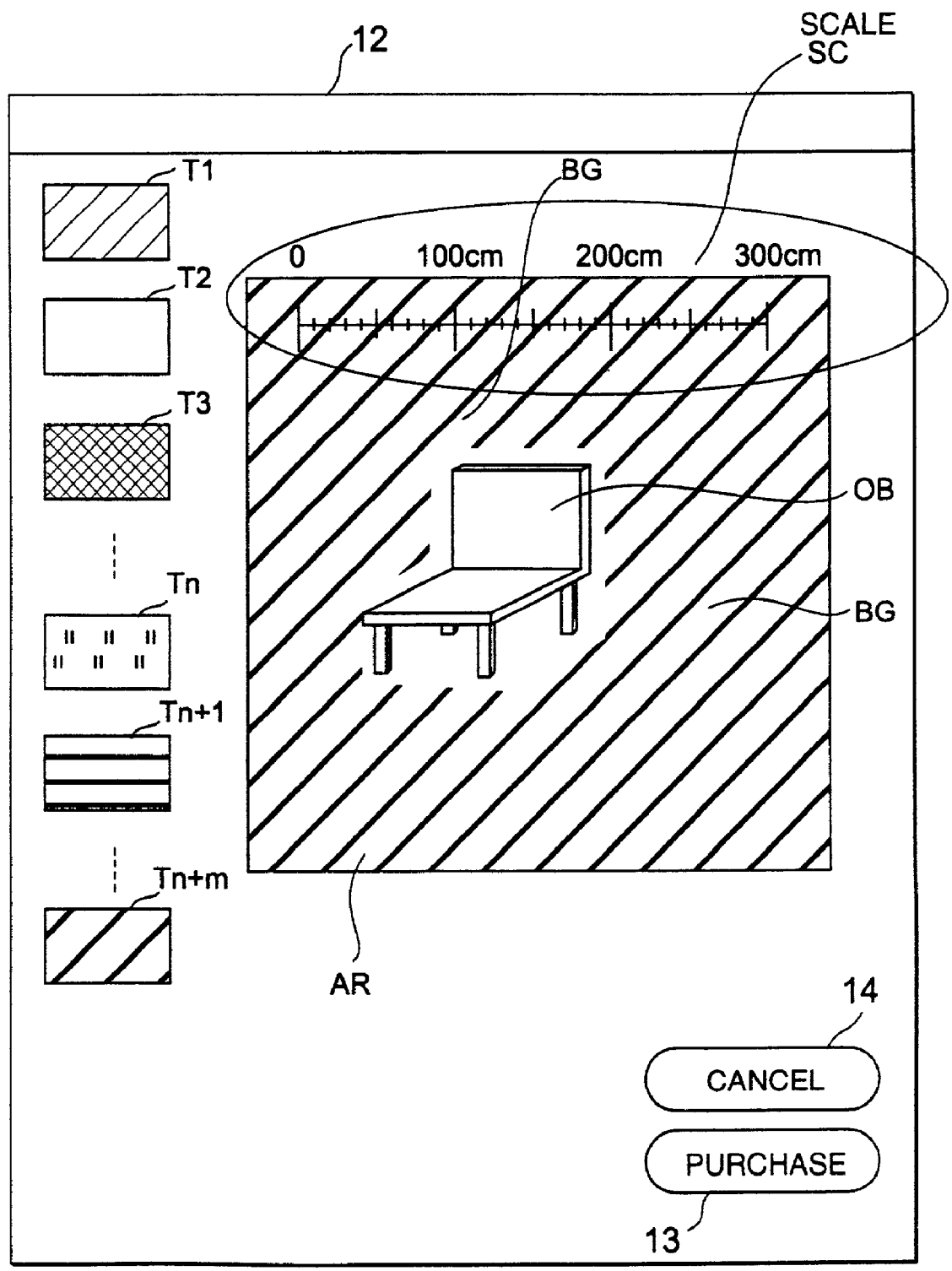
FIG. 6 is a diagram used to explain an example of a browser screen used to display a selected commodity and a selected background.

Herein, it is assumed that the texture data uploaded by the user are stored in the main memory and the other texture data are stored in the storage device. A texture address on the screen indicates a location, on the Web screen, of a texture specified by the user. More specifically, a texture address on the screen indicates the location on the screen at which a button used to select a texture is displayed. Examples of such buttons are shown in FIG. 6, wherein buttons are denoted by $T_1$ to $T_{n+m}$. If one of the buttons $T_1$ to $T_{n+m}$ is selected by the user, a texture corresponding to the selected button is identified by the location of the selected button. Thus, these buttons displayed on the screen serve as texture selection buttons.

FIG. 4 illustrates an example of the history of purchases made by a user. The purchase history data is stored in both the server 1 and the user terminals 4-1 to 4-N. This allows users of the respective user terminals 4-1 to 4-N to view their own purchase history whenever they want to view it. The purchase history data includes data indicating a commodity name, a purchase date, a color, and a background texture data address. Herein, the background texture data address refers to an address in a storage device of the server 1 or the user terminals 4-1 to 4-N.

Figure 5:
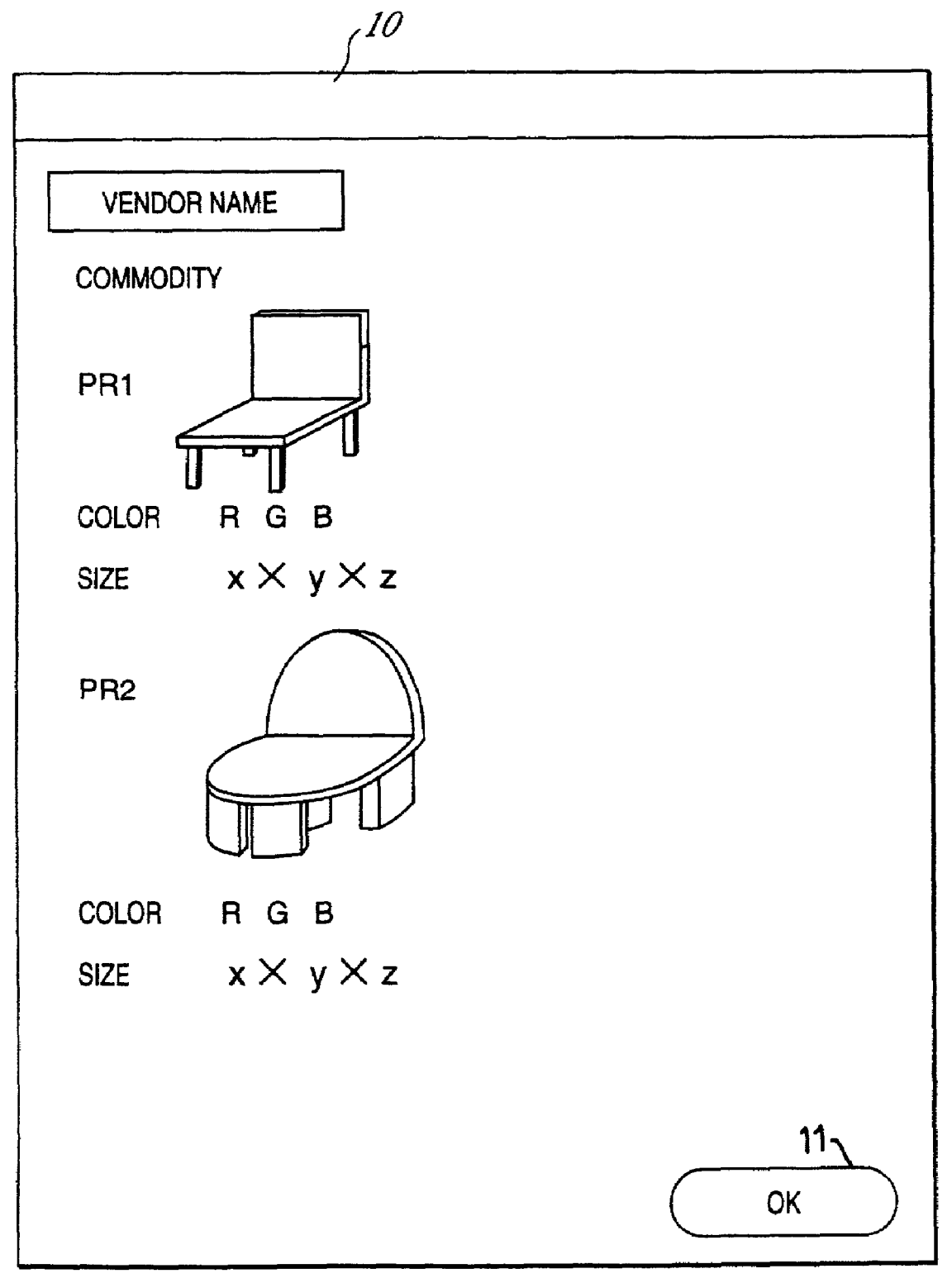

FIG. 5 is a diagram illustrating an example of a browser screen 10 used to select a commodity. As shown in FIG. 5, icons corresponding to commodities PR1 to PR2 are displayed on the browser screen 10, and small buttons for selecting colors are disposed below the icons. If a user selects, for example, commodity PR1 by clicking a corresponding icon, and if the user selects and clicks, for example, a color button "R" to specify a desired color, the color of the icon changes to the specified color. In response, data indicating the selection made by the user is stored in the memory of the server 1. Thereafter, if the user clicks an "OK" button 11, the server 1 reads information corresponding to the selection made by the user from the commodity information data shown in FIG. 2 and supplies the read information to the graphics engine 2.

The graphics engine 2 produces an image on the basis of the supplied information and adds a scale image thereto. The graphics engine 2 supplies the resultant image information to the server 1. The server 1 supplies the received image information to a corresponding one of the user terminals 4-1 to 4-N. As a result, a browser screen such as that shown in FIG. 6 is displayed on the corresponding one of the user terminals 4-1 to 4-N.

FIG. 6 illustrates an example of the browser screen 12 displayed on the user terminals 4-1 to 4-N to allow users to make confirmation. As shown in FIG. 6, an image of an object OB generated by the graphics engine 2 in accordance with the size information of the commodity is displayed in an area AR on the browser screen 12.

If the user clicks one of the buttons corresponding to texture numbers $T_1$ to $T_n$, texture data of a corresponding one of the texture numbers $T_n$ to $T_n$ is transmitted to the graphics engine 2 via the server 1. The graphics engine 2 regenerates an image so that the selected texture is employed as the background BG of the resultant regenerated image. The regenerated image is supplied to the corresponding one of the user terminals 4-1 to 4-N via the server 1 so that the image is displayed on the display of the user terminal. The background BG may be displayed in a three-dimensional fashion, if desired. In this case, a certain number of images with various textures may be prepared so that a user can select a texture that is most similar in design and color to the room of the user, and a three-dimensional image of the selected texture is combined with the image of the commodity.

The user may upload to the server 1 from his/her user terminal (one of user terminals 4-1 to 4-N) an image of a wall or the like of the room taken via a digital camera or the like. In response, the uploaded image is displayed as one of the textures $T_{n+1}$ to $T_{n+m}$ on the browser screen 12 as shown in FIG. 6. In the specific example shown in FIG. 6, the texture image $T_{n+m}$ uploaded by the user is selected on the browser screen 12. In response to the selection made by the user, the image of the selected commodity, the scale image, and the texture image corresponding to the selected texture number $T_{n+m}$ are combined together and the resultant image is displayed on the browser screen 12.

If desired, fine adjustment may be performed on texture data uploaded by a user so that the texture data matches the scale image. For example, image information indicating a scale may be included in texture data so that the texture data can be finely adjusted by comparing the scale of the texture data, indicated by the image information, with the scale of the scale image. The image information indicating the scale of the texture data may be generated so as to represent, for example, a coin whose size is fixed and well known, or a ruler. Such image information may be incorporated into texture data, for example, by taking a picture of a wall or the like as a background BG together with a coin or a ruler using a digital camera or the like.

While viewing the finally displayed image presented in the above-described fashion, the user can click the "purchase" button 13 to purchase the commodity. A "cancel" button 14 is provided for allowing a user to cancel the selection of the commodity and to view an image of another commodity. When one of these cancel buttons is clicked, the user is allowed to select another commodity.

Figure 7:
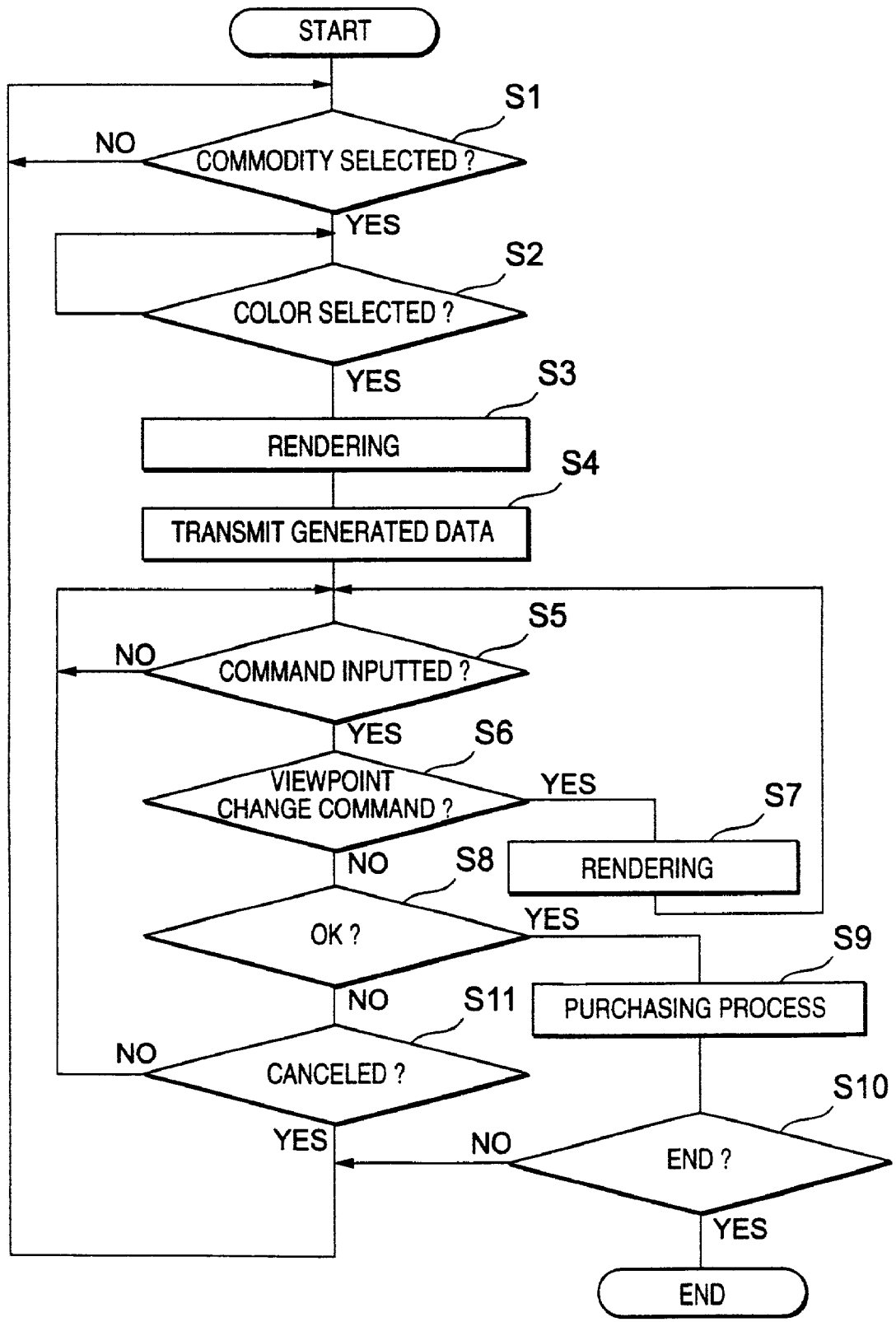
FIG. 7 is a flow chart used to explain a commodity purchase assistance process.

Now referring to the flow chart shown in FIG. 7, a commodity purchase assistance process and a commercial transaction using the electronic commerce system shown in FIG. 1 are described.

In step S1, the server 1 determines whether or not a commodity has been selected based on a command from some of user terminals 4-1 to 4-N. If "yes", the process proceeds to step S2.

In step S2, the server 1 determines whether or not a color has been selected based on a command from some of user terminals 4-1 to 4-N to select a color.

In step S3, the server 1 reads, from the commodity information database, information associated with the commodity selected by the user, that is, size data of the commodity, object data at a specified object data address, and texture data at a specified texture data address. The server 1 supplies those data to the graphics engine 2. The server 1 also supplies scale data and default background texture data to the graphics engine 2.

The graphics engine 2 performs a conversion of the image into a desired perspective view and also performs a calculation associated with lighting to calculate coordinate data. Onto the resultant polygon formed from a group of calculated coordinate data, the texture data of the commodity is mapped. The graphics engine 2 combines the image of the commodity, the scale data, and the background texture into a single image using a Z-buffer algorithm, a Z-sort algorithm, or the like and supplies the resultant display image to the server 1. Thus, the server 1 can supply the image, such as that shown in FIG. 6, to the user terminals 4-1 to 4-N.

Herein, if the user designates the texture number $T_{n+m}$ on the Web screen shown in FIG. 6, background texture data corresponding to the designated texture number is supplied from the server 1 to the graphics engine 2. In response, as described above, the graphics engine 2 regenerates an image including the background corresponding to the texture number $T_{n+m}$ as shown in FIG. 6 and supplies the resultant image to the server 1. Thus, the texture data uploaded by the user is employed as the background, as shown in FIG. 6.

The object data must be generated in advance in accordance with the actual size of the commodity and the scale size so that the size of the object image matches the size of the area AR shown in FIG. 6 and also matches the scale image previously generated.

Instead of generating the image of the commodity from the object data and texture data including a great number of polygon vertex coordinate data (x, y, z), an image of the commodity obtained by taking a picture thereof using a digital camera may be used. In this case, it is required to take the picture of the commodity (and edit the picture) so that the picture of the commodity matches the area AR shown in FIG. 6 and the scale image that has been generated in advance so as to match the area AR and stored in the server 1.

In step S5, the server 1 determines whether or not any command has been issued from some of the user terminals 4-1 to 4-N. If "yes", the process proceeds to step S6.

In step S6, the server determines whether the command issued by the user is a viewpoint change command. If "yes", the process proceeds to step S7. However, if "no", the process jumps to step S8.

In step S7, the graphics engine 2 converts the current viewpoint into a viewpoint specified by the user via his/her user terminal (one of the user terminals 4-1 to 4-N) More specifically, the graphics engine 2 extracts coordinates of the object image that can be seen from the new viewpoint, and, based on theses coordinates, converts a 3-dimensional image into a 2-dimensional perspective view, and performs a calculation associated with lighting. Alternatively, the object image may simply be moved. In this case, the respective coordinates of the object data are simply changed by values corresponding to the movement amounts of portions of the object specified by the user via the controller or the like.

In step S8, it is determined whether the "purchase" button 13 shown in FIG. 6 has been clicked. If "yes", the process proceeds to step S9. However, if "no", the process jumps to step S11.

In step S9, the server 1 supplies information of the commodity selected by the user, stored in the memory of the server 1, to a corresponding one of the vendor terminals 5-1 to 5-N via the network 3. The information sent to the vendor includes information indicating the commodity name and the color thereof. Accordingly, on the basis of the received information, the corresponding one of the vendor terminals 5-1 to 5-N makes, automatically or manually, preparation or arrangement for delivering the commodity. Thus, the commodity is delivered from the vendor to the user.

In step S10, the server 1 determines whether an end command has been issued by the user or the user terminal has been logged out. If "yes", the process shown in the flow chart of FIG. 7 is ended. However, if "no", the process returns to step S1. In the case where the process returns to step S1, the selection screen such as that shown in FIG. 5 is displayed.

In step S11, the server 1 determines whether a "cancel" command has been issued by the user. If "yes", the process returns to step 1, thereby allowing the user to select another commodity.

In the case where the answer is "no" in decision steps S5 or S11, or in the case where the process has proceeded to step S7 from step S6, the process returns to step S5.

As described above, in the present embodiment, the user can select a commodity that well matches the user's room or the like without having to see the actual commodity and thus it is possible to prevent the troublesome job of sending the commodity back to a vendor or trouble in sending back the commodity.

In the embodiments described above, the generation of images is performed by the processor 2. Alternatively, the generation of images may be performed by the user terminals 4-1 to 4-N. In this case, object data and text data are transmitted from the server 1 to user terminals 4-1 to 4-N.

Those units or devices, in the server 1, for generating images, storing object data of commodities, and storing background texture data may be connected to the terminal 4 via the network 3 independently. The device for storing background texture data may be disposed in the terminal 4 (or may be connected to the terminal 4 via a cable).

As described above, the present invention provides a system that allows a user to obtain, via the Web system, detailed information about a commodity selected by the user and to see how the commodity looks when it is placed in a background specified by the user.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended

The invention claimed is:

1. An electronic commerce system, comprising:
a user terminal operable by a user, the user terminal including a display and a user input interface operable to receive input from a user for purchasing a commodity;
a first storage unit operable to store image data of commodities for sale to the user and user purchase history data including information concerning one or more prior purchases of one or more of the commodities by the user;
a second storage unit operable to store image data of backgrounds;
a first acquisition unit operable to acquire content data of one of the commodities and content data of one of the backgrounds selected by the user via the user terminal;
a second acquisition unit operable to acquire image data representing an image of the one commodity from the first storage unit and image data of the one background from the second storage unit;
an adjustment unit operable to adjust a scale of custom image data prepared by the user by comparing image information indicating a scale incorporated into the custom image data with a scale image;
a graphics unit operable to extract coordinates of the image of the one commodity that can be seen from a viewpoint selected by the user from among a plurality of different user-selectable viewpoints and to produce a display image by combining an image of the one commodity according to the extracted coordinates and an image of the one background created from the image data of the one background; wherein the graphics unit includes a unit for incorporating the scale image into the display image; and
a supply unit operable to supply the display image to the user terminal and to supply the user purchase history data to the user terminal, thereby enabling the display image and the user purchase history data to be displayed on the display,
whereby the supply unit is operable to display the user purchase history data for reference by the user in considering purchase of the one commodity depicted in the display image, and the user input interface is operable to receive the user input for purchasing the one commodity in response to the display of the display image.

2. An electronic commerce system according to claim 1, wherein the graphics unit includes a unit for rotating the image of the one commodity.

3. An electronic commerce system according to claim 1, further comprising another acquisition unit operable to acquire from the user terminal custom image data of a background prepared by the user and to store the custom image data in the second storage unit.

4. An electronic commerce system according to claim 1, wherein the user terminal is a mobile communication terminal.

5. An electronic commerce system, comprising:
a user terminal operable by a user, the user terminal including a display and a user input interface operable to receive input from a user for purchasing a commodity; and
a commodity purchase assistance apparatus connected to the user terminal via a network, the commodity purchase assistance apparatus including:
a first storage unit operable to store image data of commodities for sale to the user and user purchase history data including information concerning one or more prior purchases of one or more of the commodities by the user;
a second storage unit operable to store image data of backgrounds;
a first acquisition unit operable to acquire content data of one of the commodities and content data of one of the backgrounds selected by the user via the user terminal;
a second acquisition unit operable to acquire image data representing an image of the one commodity from the first storage unit and image data of the one background from the second storage unit;
an adjustment unit operable to adjust a scale of custom image data prepared by the user by comparing image information indicating a scale incorporated into the custom image data with a scale image;
a graphics unit operable to extract coordinates of the image of the one commodity that can be seen from a viewpoint selected by the user from among a plurality of different user-selectable viewpoints and to produce a display image by combining an image of the one commodity according to the extracted coordinates and an image of the one background created from the image data of the one background; wherein the graphics unit includes a unit for incorporating the scale image into the display image; and a supply unit operable to supply the display image to the user terminal and to supply the user purchase history data to the user terminal, thereby enabling the display image and the user purchase history data to be displayed on the display, whereby the supply unit is operable to display the user purchase history data for reference by the user in considering purchase of the one commodity depicted in the display image, and the user input interface is operable to receive the user input for purchasing the one commodity in response to the display of the display image.

6. An electronic commerce system according to claim 5, wherein the commodity purchase assistance apparatus further includes a unit operable to allow the commodity purchase assistance apparatus to function as a server.

7. An electronic commerce system according to claim 5, wherein the user terminal further includes a transmitter unit operable to transmit to the commodity purchase assistance apparatus a request to purchase a commodity corresponding to the display image displayed on the display.

8. An electronic commerce system according to claim 7, wherein the commodity purchase assistance apparatus further includes a unit operable to make an arrangement for delivering the commodity when the request for purchasing the commodity is transmitted thereto from the user terminal.

9. An electronic commerce system, comprising:
a user terminal operable by a user, the user terminal including a display and a user input interface operable to receive input from a user for purchasing a commodity;
a first storage unit operable to store image data of commodities for sale to the user and user purchase history data including information concerning one or more prior purchases of one or more of the commodities by the user;
a second storage unit operable to store image data of backgrounds; and
a commodity purchase assistance apparatus connected to the user terminal and the first and second storage units, the commodity purchase assistance apparatus including:
a first acquisition unit operable to acquire content data of one of the commodities and content data of one of the backgrounds selected by the user via the user terminal;
a second acquisition unit operable to acquire image data representing an image of the one commodity from the first storage unit and image data of the one background from the second storage unit;
an adjustment unit operable to adjust a scale of custom image data prepared by the user by comparing image information indicating a scale incorporated into the custom image data with a scale image;
a graphics unit operable to extract coordinates of the image of the one commodity that can be seen from a viewpoint selected by the user from among a plurality of different user-selectable viewpoints and to produce a display image by combining an image of the one commodity according to the extracted coordinates and an image of the one background created from the image data of the one background; wherein the graphics unit includes a unit for incorporating the scale image into the display image; and
a supply unit operable to supply the display image to the user terminal and to supply the user purchase history data to the user terminal, thereby enabling the display image and the user purchase history data to be displayed on the display,
whereby the supply unit is operable to display the user purchase history data for reference by the user in considering purchase of the one commodity depicted in the display image, and the user input interface is operable to receive the user input for purchasing the one commodity in response to the display of the display image.

10. A commodity purchase assistance apparatus connectable via a network to a user terminal, the user terminal being operable by a user and including a display, the commodity purchase assistance apparatus comprising:
a first storage unit operable to store image data of commodities for sale to the user and user purchase history data including information concerning one or more prior purchases of one or more of the commodities by the user;
a second storage unit operable to store image data of backgrounds;
a first acquisition unit operable to acquire content data of one of the commodities and content data of one of the backgrounds selected by the user via the user terminal;
a second acquisition unit operable to acquire image data representing an image of the one commodity from the first storage unit and image data of the one background from the second storage unit;
an adjustment unit operable to adjust a scale of custom image data prepared by the user by comparing image information indicating a scale incorporated into the custom image data with a scale image;
a graphics unit operable to extract coordinates of the image of the one commodity that can be seen from a viewpoint selected by the user from among a plurality of different user-selectable viewpoints and to produce a display image by combining an image of the one commodity according to the extracted coordinates and an image of the one background created from the image data of the one background; wherein the graphics unit includes a unit for incorporating the scale image into the display image; and
a supply unit operable to supply the display image to the user terminal and to supply the user purchase history data to the user terminal, thereby enabling the display image to be displayed on the display,
whereby the supply unit is operable to display the user purchase history data for reference by the user in considering purchase of the one commodity depicted in the display image and the user input interface is operable to receive the user input for purchasing the one commodity in response to the display of the display image.

11. A commodity purchase assistance apparatus according to claim 10, wherein the graphics unit includes a unit for rotating the image of the one commodity.

12. A commodity purchase assistance apparatus according to claim 10, further comprising another acquisition unit operable to acquire from the user terminal custom image data of a background prepared by the user and to store the custom image data in the second storage unit.

13. A commodity purchase assistance apparatus according to claim 10, wherein the image data of the one background is stored in advance in the second storage unit or supplied from the user terminal.

14. A commodity purchase assistance apparatus according to claim 10, further comprising a unit operable to allow the commodity purchase assistance apparatus to function as a server.

15. A terminal operable by a user, the terminal being connectable via a network to a storage device operable to store image data of commodities for sale to the user and to store image data of backgrounds, the terminal comprising:
 a display;
 a user input interface operable by the user to select one of the commodities and one of the backgrounds;
 an acquisition unit operable to acquire image data representing an image of the one commodity and image data of the one background from the storage device and to acquire user purchase history data including information concerning one or more prior purchases of one or more of the commodities by the user;
 an adjustment unit operable to adjust a scale of custom image data prepared by the user by comparing image information indicating a scale incorporated into the custom image data with a scale image;
 a graphics unit operable to extract coordinates of the image of the one commodity that can be seen from a viewpoint selected by the user from among a plurality of different user-selectable viewpoints and to produce a display image by combining an image of the one commodity according to the extracted coordinates and an image of the one background created from the image data of the one background; wherein the graphics unit includes a unit for incorporating the scale image into the display image; and
 a unit operable to display the display image and the user purchase history data on the display for reference by the user in considering purchase of the one commodity depicted in the display image,
 whereby the user input interface is operable to receive the user input for purchasing the one commodity in response to the display of the display image.

16. A terminal operable by a user, the terminal being connected via a network to a storage device operable to store image data of commodities for sale to the user, the terminal comprising:
 a display;
 a storage unit operable to store image data of backgrounds;
 a user input interface operable by the user to select one of the commodities and one of the backgrounds;
 an acquisition unit operable to acquire image data representing an image of the one commodity from the storage device and image data of the one background from the storage unit and to acquire user purchase history data including information concerning one or more prior purchases of one or more of the commodities by the user;
 an adjustment unit operable to adjust a scale of custom image data prepared by the user by comparing image information indicating a scale incorporated into the custom image data with a scale image;
 a graphics unit operable to extract coordinates of the image of the one commodity that can be seen from a viewpoint selected by the user from among a plurality of different user-selectable viewpoints and to produce a display image by combining an image of the one commodity according to the extracted coordinates and an image of the one background created from the image data of the one background; wherein the graphics unit includes a unit for incorporating the scale image into the display image; and
 a unit operable to display the display image and the user purchase history data on the display for reference by the user in considering purchase of the one commodity depicted in the display image,
 whereby the user input interface is operable to receive the user input for purchasing the one commodity in response to the display of the display image.

17. A method using a computer for assisting a user in purchasing a commodity, the method comprising:
 acquiring content data of a particular commodity and content data of a background selected by the user via a user terminal;
 acquiring image data corresponding to the particular commodity representing an image of the particular commodity and image data corresponding to the selected background from a storage unit;
 acquiring user purchase history data including information concerning one or more prior purchases of one or more of the commodities by the user;
 adjusting a scale of custom image data prepared by the user by comparing image information indicating a scale incorporated into the custom image data with a scale image;
 producing a display image by extracting coordinates of the image of the particular commodity that can be seen from a viewpoint selected by the user from among a plurality of different user-selectable viewpoints and combining an image of the particular commodity according to the extracted coordinates and an image of the selected background from the acquired image data; wherein the scale image is incorporated into the display image;
 displaying the display image on a display of the user terminal;
 displaying the user purchase history data for reference by the user in considering purchase of the one commodity depicted in the display image; and
 when the user decides to purchase the one commodity, receiving user input for purchasing the one commodity in response to the display of the display image.

18. A method according to claim 17, further comprising storing image data of a background prepared by the user in the storage unit.

* * * * *